US012605823B1

(12) United States Patent

Hewitt

(10) Patent No.: US 12,605,823 B1

(45) Date of Patent: Apr. 21, 2026

(54) HUMANOID ANDROID

(71) Applicant: Victoria Hewitt, Upper Marlboro, MD (US)

(72) Inventor: Victoria Hewitt, Upper Marlboro, MD (US)

( * ) Notice: Subject to any disclaimer, the term of this patent is extended or adjusted under 35 U.S.C. 154(b) by 118 days.

(21) Appl. No.: 18/626,511

(22) Filed: Apr. 4, 2024

(51) Int. Cl.
| *G06F 17/00* | (2019.01) |
| *B25J 9/00* | (2006.01) |
| *B25J 11/00* | (2006.01) |
| *B62D 57/032* | (2006.01) |
| *G05B 19/4155* | (2006.01) |
| *B25J 9/16* | (2006.01) |

(52) U.S. Cl.
CPC ......... *B25J 9/0003* (2013.01); *B25J 11/0015* (2013.01); *B62D 57/032* (2013.01); *G05B 19/4155* (2013.01); *B25J 9/163* (2013.01); *G05B 2219/40016* (2013.01)

(58) Field of Classification Search
CPC ...... B25J 9/0003; B25J 11/0015; B25J 9/163; B62D 57/032; G05B 19/4155; G05B 2219/40016
USPC ........................................................ 700/246
See application file for complete search history.

(56) References Cited

U.S. PATENT DOCUMENTS

| 4,889,210 A | 12/1989 | Alcaraz et al. | |
| 7,024,276 B2 * | 4/2006 | Ito ......................... | G06N 3/008 |
| | | | 318/568.15 |

| 7,062,438 B2 * | 6/2006 | Kobayashi ............ | G10L 13/033 |
| | | | 704/260 |
| 7,088,853 B2 * | 8/2006 | Hiroe ...................... | G10L 15/06 |
| | | | 704/E15.041 |
| 7,183,482 B2 * | 2/2007 | Kobayashi ........... | G10H 1/0066 |
| | | | 84/645 |
| 7,189,915 B2 * | 3/2007 | Kobayashi ............. | G10H 7/002 |
| | | | 84/645 |
| 7,278,501 B2 * | 10/2007 | Mori ...................... | B25J 9/1641 |
| | | | 180/8.5 |
| 8,795,025 B1 * | 8/2014 | Hunt ...................... | A63H 11/00 |
| | | | 446/297 |
| 9,573,276 B2 | 2/2017 | Stephens, Jr. | |
| 2003/0152261 A1 * | 8/2003 | Hiroe ...................... | G10L 15/24 |
| | | | 704/E15.041 |
| 2004/0019484 A1 * | 1/2004 | Kobayashi .............. | G10L 13/02 |
| | | | 704/258 |
| 2004/0019485 A1 * | 1/2004 | Kobayashi ............ | G10L 13/033 |
| | | | 704/260 |
| 2004/0036437 A1 * | 2/2004 | Ito .......................... | G06N 3/008 |
| | | | 180/8.6 |

(Continued)

OTHER PUBLICATIONS

My Bigfoot—Stan Winston School of Character Arts Forums (Year: 2023) (Year: 2023).*

*Primary Examiner* — Ronnie M Mancho
(74) *Attorney, Agent, or Firm* — Sanchelima & Associates, P.A.; Christian Sanchelima; Jesus Sanchelima

(57) ABSTRACT

A humanoid android including a head assembly, an upper body assembly, and a legs assembly mimicking human movements. The head assembly and the legs assembly are attached to the upper body assembly resembling a human body. The humanoid android further comprises a skin assembly including a skin that can be of different colors to resemble humans of different ethnicities. The human android further has a processor unit programmed to learn mimicking human movements.

8 Claims, 5 Drawing Sheets

(56) References Cited

U.S. PATENT DOCUMENTS

| | | | | |
|---|---|---|---|---|
| 2004/0122556 A1* | 6/2004 | Mori | .................... | B62D 57/032 |
| | | | | 700/245 |
| 2006/0156909 A1* | 7/2006 | Kobayashi | ............. | G10H 7/002 |
| | | | | 84/645 |
| 2006/0185504 A1* | 8/2006 | Kobayashi | ............. | G10H 7/002 |
| | | | | 84/645 |
| 2007/0198444 A1* | 8/2007 | Movellan | ............... | B25J 13/003 |
| | | | | 706/12 |

* cited by examiner

HUMANOID ANDROID

BACKGROUND OF THE INVENTION

1. Field of the Invention

The present invention relates to humanoid robots and, more particularly, to a humanoid android that includes a humanoid shaped robot that mimics human movements.

2. Description of the Related Art

Several designs for humanoid robots have been designed in the past. None of them, however, include a humanoid android that resembles humans and is able to mimic human movements.

Applicant believes that a related reference corresponds to U.S. Pat. No. 4,889,210 issued for a robotic product server and system including a robot for serving a product dispensed from a product dispenser to a customer including a processor and a robotic arm. The robotic arm is responsive to certain ones of the command signals for transferring the dispensed product from a product dispense location to a position adjacent to customer for removal by the customer. Applicant believes that another related reference corresponds to U.S. Pat. No. 9,573,276 issued for Space exploration human robots including a system and method of space exploration with human-controlled proxy robot surrogates. The method includes training the robots using human handlers, controlling the robots using human handlers, and deploying the robots for extraterrestrial missions. The robots further comprise artificial intelligence. None of these references, however, teach of a humanoid android comprising a humanoid shaped robotic apparatus that is configured to autonomously mimic human movements.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a humanoid android that is able to mimic human movements to do human tasks and works.

It is another object of this invention to provide a humanoid android that resembles humans of different ethnicities so people can interact with the humanoid android in a more trustable manner.

It is still another object of the present invention to provide a humanoid android that is able to learn human movements in different environments.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
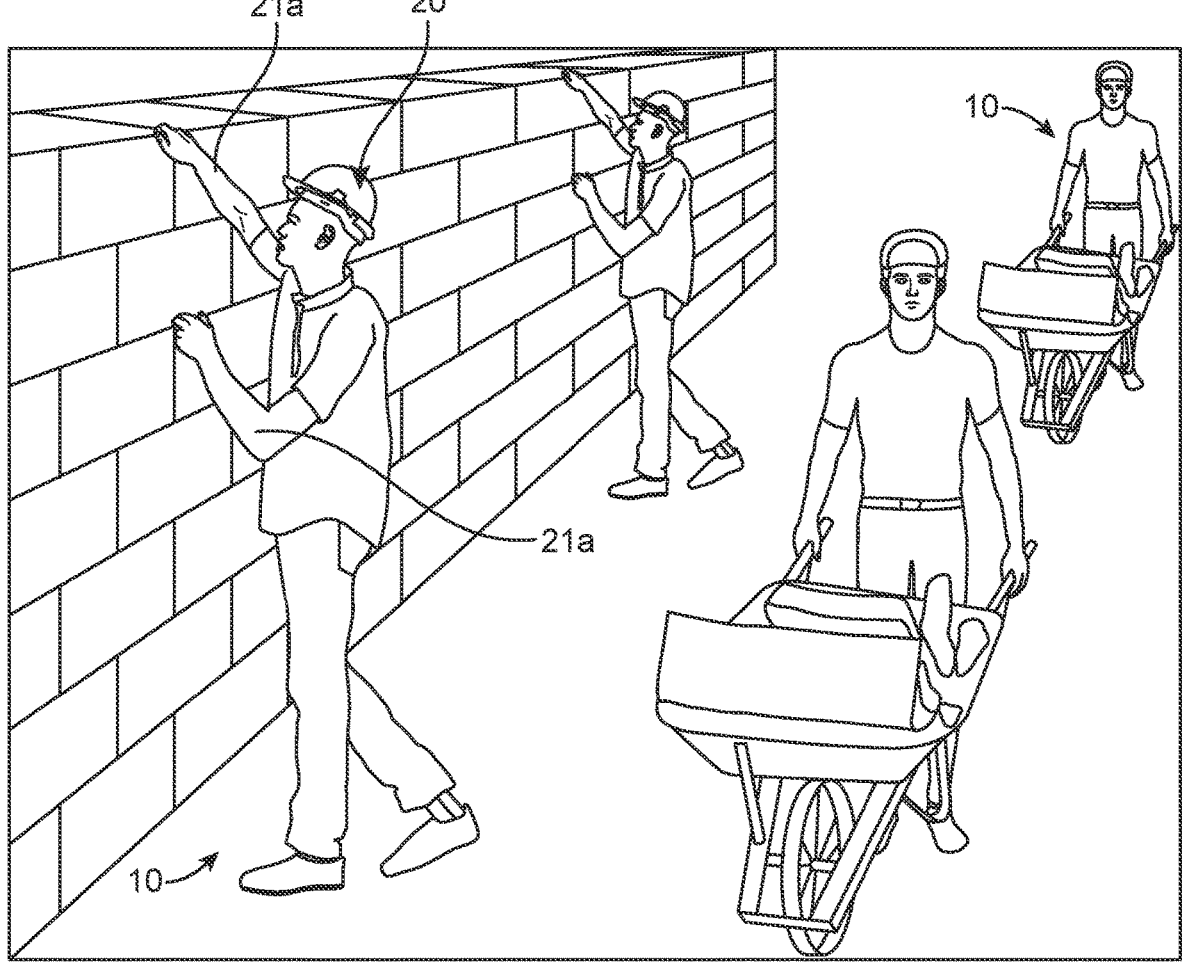
FIG. 1 represents an isometric operational view of the present invention showing humanoid androids 10 mimicking humans 100 movements to perform different tasks.
Figure 2:
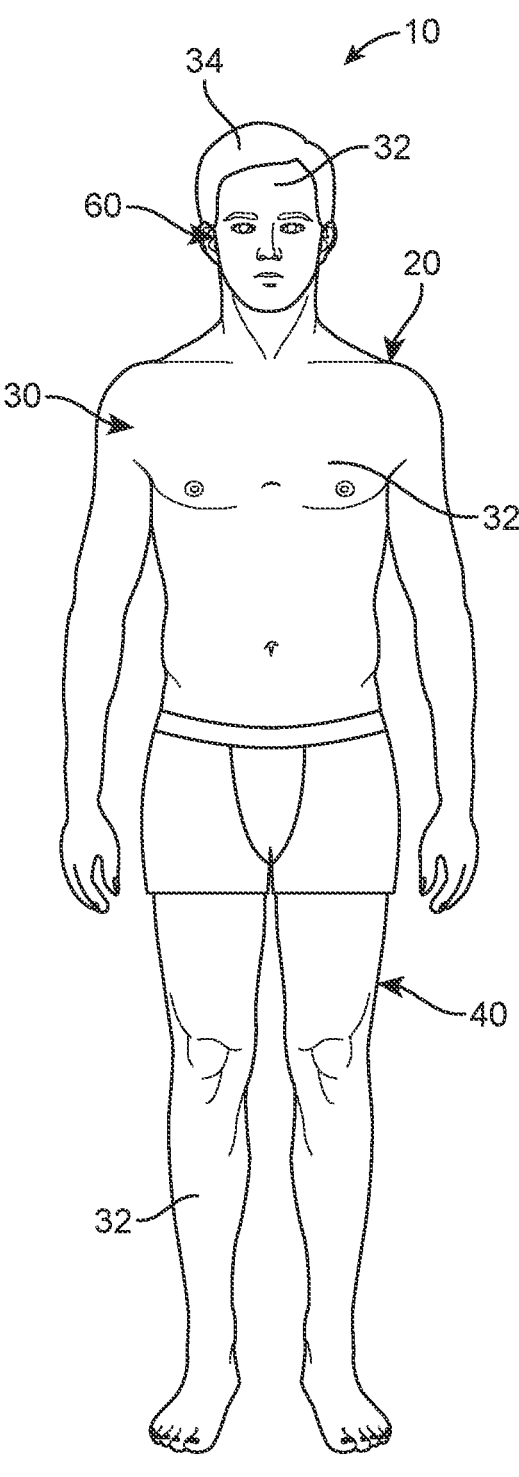
FIG. 2 shows a front view of the the present invention humanoid android 10 including a head assembly 60, an upper body assembly 20, and a legs assembly 40 covered with artificial skin 32.

Referring now to the drawings, where the present invention is generally referred to with numeral 10, it can be observed that it basically includes a upper body assembly 20, a legs assembly 40, and a head assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 3:
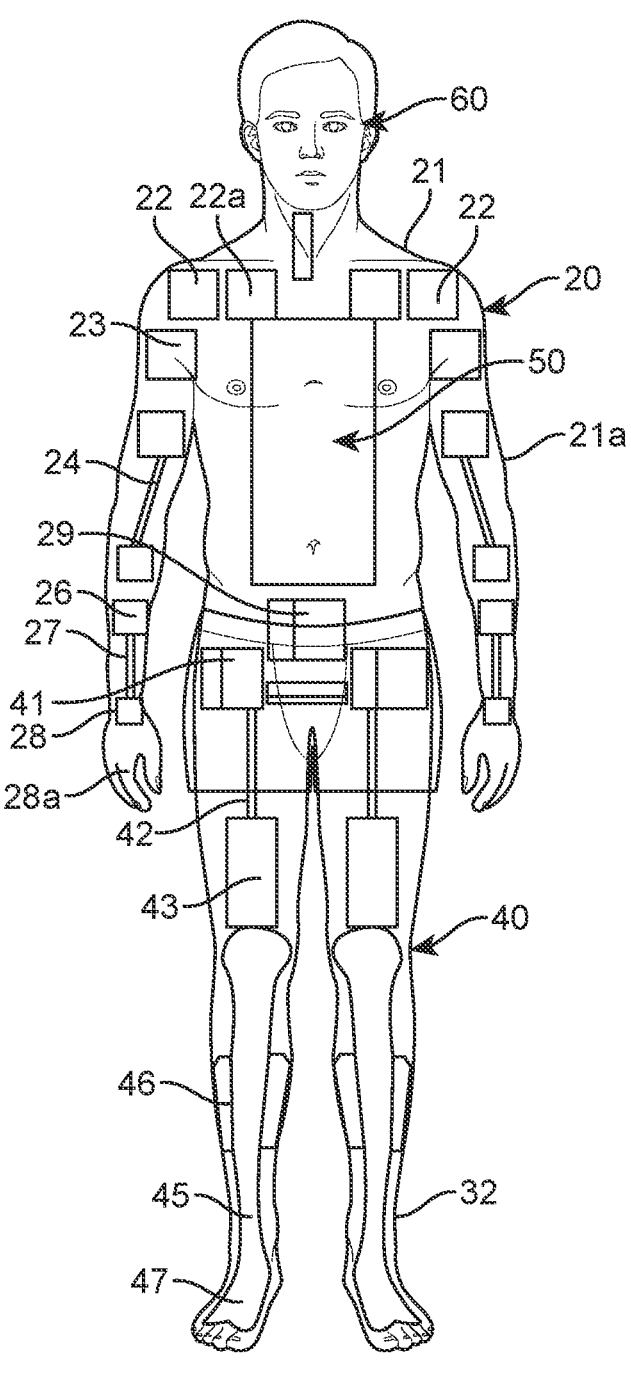
FIG. 3 illustrates a see-through view of the humanoid android 10 depicting the actuators and the processor unit 50 embedded inside the artificial skin 32.

Best observed in FIG. 3, the upper body assembly 20 may include a trunk portion 21. The trunk portion 21 is a structural support portion with a shape and complexion of a trunk of humans of any ethnicity. The trunk portion 21 may provide support to the set of actuators of the upper body of the android and further provide to the robotic arms 21a of the android. The upper body assembly 20 may include a set of actuators to provide mobility to the humanoid android. The set of actuators may be one of electromechanical actuators, hydraulic actuators, pneumatic actuators, tendon-driven actuators, electroactive polymers, shape-memory materials, soft fluidic actuators, any combination thereof, or any other suitable actuator for a humanoid android as known in the prior art. The selection of the actuators may be depending on the application of the humanoid android. It may be possible to design humanoid android specifically to perform certain human tasks that involve hard work such as construction tasks, such robots would require actuators with a high torque. It also may be suitable to select the actuators according to a specific human complexity and the degree of flexibility required from the humanoid android.

A first actuator 22a and a second actuator 22 may be located at shoulder portions of the trunk portion 21. The second actuator 22 may be located at an outer position of each side of shoulder portion and the first actuator 22a may be located at an inner position of each shoulder portion. The first actuator 22a at each shoulder may allow the rotational lateral motion of the robotic arms 21a. The second actuator 22 may allow the rotational frontal motion of the robotic arms 21a. Each of the robotic arms 21a may include a first link 24 and a second link 27 similarly to the upper arm and forearm portions of a real human arm.

Each of the two robotic arms 21a may have a third actuator 23, a fourth actuator 26, and a fifth actuator 28. The third actuator 23 may allow the flexion of the each of the robotic arms 21a at an elbow portion. The fourth actuator 26 may allow the movement of a hand portion of each of the hands. The fifth actuator 28 may be connected to the fingers 28a of each of the robotic arms 21a to actuate the movement of the fifth actuator 28. It should be understood the robotic arms 21a may include actuators to move each of the different joints similarly to a human arm. The trunk portion 21 of the upper body assembly 20 may be operatively connected to the legs assembly 40 using a sixth actuator 29. The sixth actuator 29 may allow to rotate the trunk portion 21 respect to the legs assembly 40.

The legs assembly 40 may include two robotic legs and a set of actuators. The set of actuators may be one of electro-mechanical actuators, hydraulic actuators, pneumatic actuators, tendon-driven actuators, electroactive polymers, shape-memory materials, soft fluidic actuators, any combination thereof, or any other suitable actuator for a humanoid android as known in the prior art. Each of the two robotic legs may include a seventh actuator 41, a third link 42, an eight actuator 43, a fourth link 45, a ninth actuator 46, and a foot 47. The third link 42 and fourth link 45 may provide support to the robotic legs similarly to the femur and tibia bones of a human body. The seventh actuator 41 may allow the frontal flexion of each of the two robotic legs with respect to the trunk portion 21. The eight actuator 43 may allow the flexion of the robotic legs at a knee portion. The ninth actuator 46 may allow the flexion of the foot 47 respect to the ninth actuator 46. It should be understood that the legs assembly 40 may have the suitable actuators and links to mimic as close as possible to the locomotion of real human legs. The legs assembly 40 and the upper body assembly 20 may be provided with an exoskeleton structure defining the body shape structure. The exoskeleton structure maybe heat resistant allowing the humanoid android to be used in different environments.

The head assembly 60 may be operatively attached to the upper portion of the trunk portion 21. The head assembly 60, legs assembly 40, and upper body assembly 20 may be entirely covered by skin assembly 30. The skin assembly 30 may include artificial skin 32 and artificial hair 34. Preferably the artificial skin 32 may be made of mechanically and biologically skin-like elastomers materials. The elastomers may have skin properties such as compliance, toughness, elasticity, and tear resistance. The artificial skin 32 may have a set of sensors. The set of sensors for the artificial skin 32 may be piezo capacitive pressure sensors made with high pressure sensitivity and rapid response properties.

The artificial skin 32 may be made of any suitable material that mimics mechanical and biological properties of human skin. The artificial skin 32 may be stretched and compressed in a similar way to human skin. Preferably the artificial skin 32 may be provided in a wide variety of colors and textures mimicking the real skin of humans of different ethnicities including African Americans, Hispanic and Latino Americans, White, Asian, Native Americans, or any other variation thereof. The artificial hair 34 may be inserted into the artificial skin 32 at the typical regions of a human body, for example the artificial hair 34 may be provided on the top portion of the head and in the eyebrow region. The artificial hair 34 may have different looks. It should be understood that the skin assembly 30 may entirely cover the upper body assembly 20, legs assembly 40, and head assembly 60 to make the humanoid android have the appearance of a human body of any complexion and ethnicity. The artificial skin 32 may cover the actuators and links inside the body. The sensors of the artificial skin 32 may allow the humanoid android to detect and sense the surroundings by touch.

Figure 4:
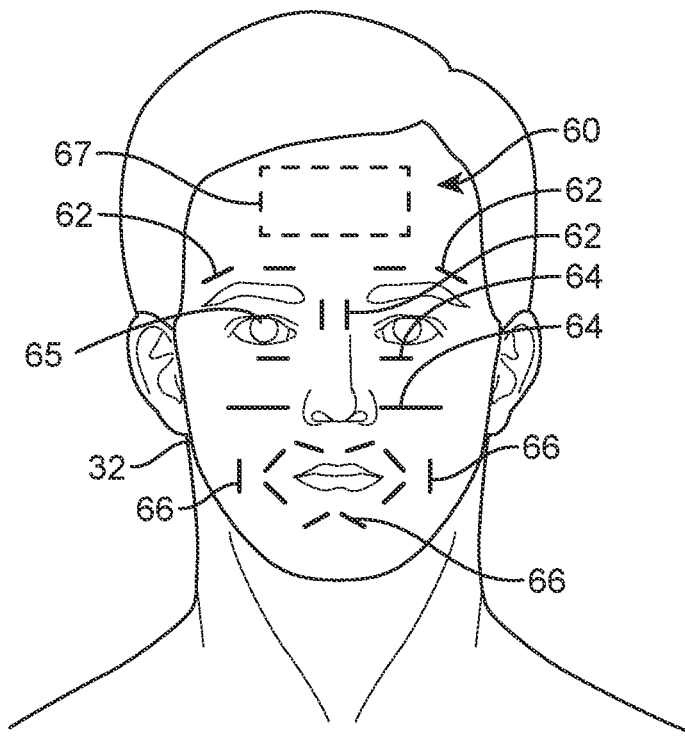
FIG. 4 is a representation of a see-trough view of the head assembly 60 depicting the face actuators embedded inside the artificial skin 32.
Figure 5:
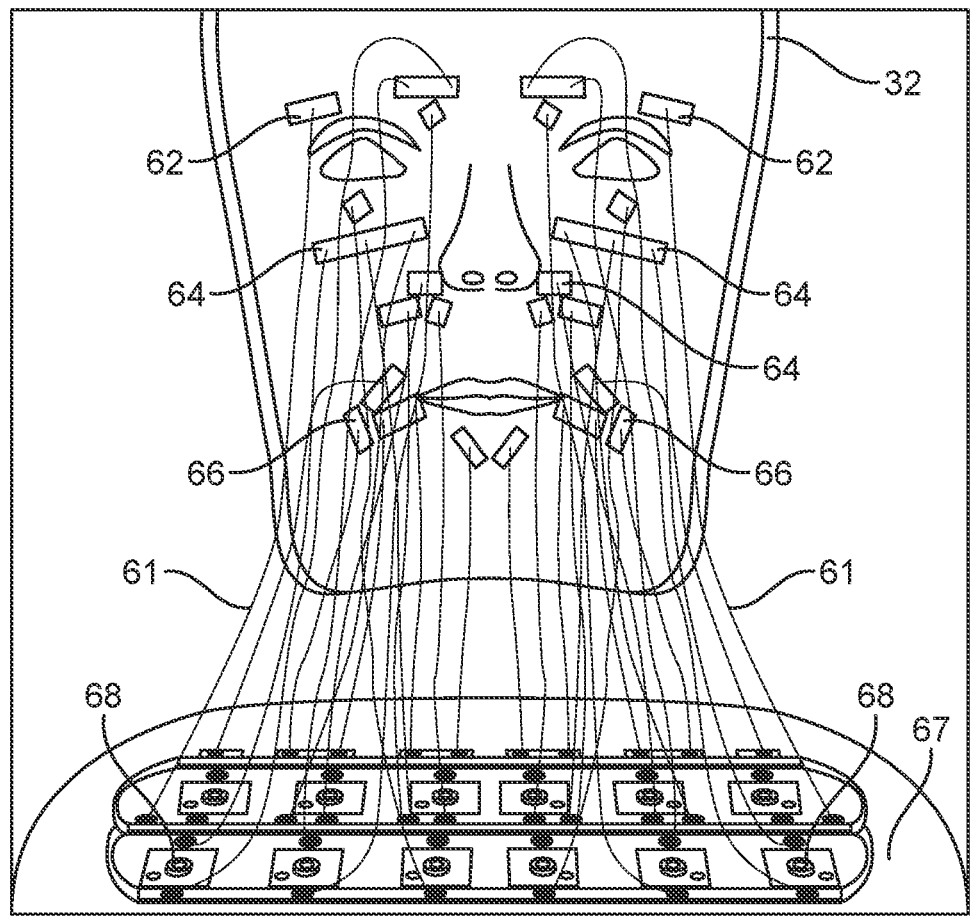
FIG. 5 is a representation of rear view of a head portion of the artificial skin 32 showing the face actuators connected with wires 61 to a set of actuators 68.

Referring now to FIG. 4 and FIG. 5, the head assembly 60 may have frontal clips 62, nasal clips 64, oral clips 66. The frontal clips 62, nasal clips 64, and oral clips 66 may be operatively connected to a set of actuators 68 using wires 61. The wires 61 may transmit movement of the set of actuators 68 to independently move each of the clips. The frontal clips 62 may be a set of clips attached to an interior portion of artificial skin 32. The frontal clips 62 may be located on a forehead and eyebrows portion. The nasal clips 64 may be located around a nasal portion of the head assembly 60. The oral clips 66 may be located around a mouth portion of the oral clips 66. The set of actuators 68 may be embedded inside the head assembly 60. The set of actuators 68 may pull the wires to move the frontal clips 62, nasal clips 64 or oral clips 66 to stretch and compress the artificial skin 32 covering the face portion of the head assembly 60 to mimic the facial expressions of a human being. The head assembly 60 may further include optical sensors 65. The optical sensors 65 may be placed on the eyes cavities of the head assembly 60. The optical sensors 65 may be designed to mimic real human eyes in color and shape. The head assembly 60 may be operatively attached to the trunk portion 21.

The humanoid android may further include a processor unit 50 embedded inside the body. In one embodiment, the processor unit 50 may be embedded in the trunk portion 21. The processor unit 50 may be a central unit processor comprising a memory, microcontrollers, databuses, processor, and other components typical for a processor unit. The processor unit 50 may be operatively connected to the actuators of the upper body assembly 20, legs assembly 40, and head assembly 60 through suitable electronic drivers. The processor unit 50 may control the actuation of the actuators and thereby control the movements of the humanoid android as a whole. The processor unit 50 may receive information captured by sensors located on the artificial skin 32. The processor unit 50 may further process information from the optical sensors 65. The processor unit 50 and the actuators may be powered by a battery embedded in the humanoid android.

The processor unit 50 may be programmed to mimic the locomotion of humans in functions such as walking, moving objects, or other human tasks. The processor unit 50 may be programmed with Artificial intelligence algorithms including machine learning algorithms. The machine learning algorithms may use deep learning with neural networks to learn from data captured by the sensors or introduced manually. The deep learning may allow the humanoid android to extract relevant features from the data and recognize patterns. The deep learning algorithms may allow the processor unit 50 to compute image recognition, natural language processing, speech recognition. The skin sensors and optical sensors may be feedback for the algorithm controls of the actuators of the humanoid android. The deep learning algorithms may allow the humanoid android to learn from humans to perform daily tasks and activities. The humanoid android may work in different environments including exploring, space exploration, combat, construction, domestic tasks, manufacturing tasks, gardening, or any other suitable activity. The humanoid android may learn by observing a human performing a task. For example in FIG. 1, the humanoid android 10 is mimicking humans performing tasks in a construction site. It should be understood that the humanoid android may have the actuators, links, and structural components that allow mimicking and resembling humans of different complexions and ethnicities.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A humanoid android, comprising:
   a. an upper body assembly including a trunk and robotic arms configured to mimic human movements;
   b. a legs assembly including robotic legs configured to mimic the human movements, wherein said robotic legs assembly is operatively attached to the upper body assembly;
   c. a head assembly including a robotic head configured to mimic a head of a human, said head is operatively attached to the upper body assembly;
   d. an artificial skin covering said upper body assembly, said legs assembly, and said head assembly;
   e. a plurality of pressure sensors integrated into said artificial skin, said pressure sensors configured to detect touch and provide environmental touch feedback to enable detection of surroundings;
   f. a plurality of facial clips attached to an interior portion of said artificial skin at a face portion of said head assembly, wherein said plurality of facial clips comprises:
      i. frontal clips located on forehead and eyebrow portions;
      ii. nasal clips located around a nasal portion; and
      iii. oral clips located around a mouth portion;
   g. a set of facial actuators embedded inside said head assembly;
   h. wires operatively connecting said plurality of facial clips to said set of facial actuators, wherein said set of facial actuators independently actuate said frontal clips, said nasal clips, and said oral clips via said wires to stretch and compress said artificial skin at said face portion to mimic human facial expressions; and
   i. a processor unit operatively connected to said pressure sensors and said set of facial actuators.

2. The humanoid android set forth in claim 1, further including a set of actuators embedded inside the upper body assembly, the legs assembly, and the head assembly; wherein said set of actuators are operatively connected to said processor unit.

3. The humanoid android set forth in claim 2, wherein each of the robotic arms include two links and a hand portion with fingers forming the robotic arm, wherein the set of actuators allow the movement of the two links and the hand portion of the robotic arm; and wherein said upper body assembly includes an exoskeleton structure that is heat resistant to allow operation in different environmental temperatures.

4. The humanoid android set forth in claim 2, wherein each of the robotic legs include two links and a foot, wherein the set of actuators allow the movement of the links and foot, thereby allowing the human android to perform tasks such as walking; and wherein said legs assembly includes an exoskeleton structure that is heat resistant to allow operation in different environmental temperatures.

5. The humanoid android set forth in claim 2, wherein the robotic arms are operatively connected to the trunk, wherein the set of actuators allows the robotic arms to move; and wherein said trunk includes an exoskeleton structure that is heat resistant to allow operation in different environmental temperatures.

6. The humanoid android set forth in claim 1 further including said processor unit embedded inside the upper body assembly, said processor unit is programmed with deep learning algorithms to learn to perform human tasks; wherein said processor unit receives environmental touch feedback from said pressure sensors and controls said set of facial actuators to produce said human facial expressions.

7. A humanoid android, comprising:
   a. a skin assembly including artificial skin and artificial hair, said artificial skin has elasticity, texture and color;
   b. an upper body assembly including a trunk and robotic arms configured to mimic human movements, wherein the robotic arms are operatively connected to the trunk, each of said robotic arms includes a set of actuators, two links, and a hand with fingers, wherein the set of actuators allow the movement of the links and fingers of the robotic arm, wherein said upper body is entirely covered by the artificial skin;
   c. a legs assembly including robotic legs configured to mimic the human movements, wherein said robotic legs assembly is operatively attached to the upper body assembly, each of said legs includes the set of actuators, two links, and a foot, said set of actuators allow the movement of the links and foot for the operation of the robotic legs, said legs assembly is entirely covered by the artificial skin;
   d. a head assembly including a robotic head configured to mimic a head of a human, said head is operatively attached to the upper body assembly, said head assembly is covered by the artificial skin, a portion of the head assembly has artificial hair;
   e. a plurality of pressure sensors integrated into said artificial skin, said pressure sensors configured to detect touch and provide environmental touch feedback to enable detection of surroundings;
   f. a plurality of facial clips attached to an interior portion of said artificial skin at a face portion of said head assembly, wherein said plurality of facial clips comprises:
      i. frontal clips located on forehead and eyebrow portions;
      ii. nasal clips located around a nasal portion; and
      iii. oral clips located around a mouth portion;
   g. a set of facial actuators embedded inside said head assembly;
   h. wires operatively connecting said plurality of facial clips to said set of facial actuators, wherein said set of facial actuators independently actuate said frontal clips, said nasal clips, and said oral clips via said wires to stretch and compress said artificial skin at said face portion to mimic human facial expressions;
   i. an exoskeleton structure supporting said upper body assembly, said legs assembly, and said head assembly, wherein said exoskeleton structure is heat resistant to allow operation in different environmental temperatures; and
   j. a processor unit embedded inside the upper body assembly, said processor unit is programmed with deep learning algorithms to learn to perform human tasks, wherein said processor unit receives environmental touch feedback from said pressure sensors and controls said set of facial actuators to produce said human facial expressions.

7

8. A humanoid android, consisting of:

a. a skin assembly including artificial skin and artificial hair, said artificial skin has elasticity, texture and color;

b. an upper body assembly including a trunk and robotic arms configured to mimic human movements, wherein the robotic arms are operatively connected to the trunk, each of said robotic arms includes a set of actuators, two links, and a hand with fingers, wherein the set of actuators allow the movement of the links and fingers of the robotic arm, wherein said upper body is entirely covered by the artificial skin;

c. a legs assembly including robotic legs configured to mimic the human movements, wherein said robotic legs assembly is operatively attached to the upper body assembly, each of said legs includes the set of actuators, two links, and a foot, said set of actuators allow the movement of the links and foot for the operation of the robotic legs, said legs assembly is entirely covered by the artificial skin;

d. a head assembly including a robotic head configured to mimic a head of a human, said head is operatively attached to the upper body assembly, said head assembly is covered by the artificial skin, a portion of the head assembly has artificial hair;

e. a plurality of pressure sensors integrated into said artificial skin, said pressure sensors configured to detect touch and provide environmental touch feedback to enable detection of surroundings;

f. a plurality of facial clips attached to an interior portion of said artificial skin at a face portion of said head assembly, wherein said plurality of facial clips comprises:

i. frontal clips located on forehead and eyebrow portions;

ii. nasal clips located around a nasal portion; and iii. oral clips located around a mouth portion;

g. a set of facial actuators embedded inside said head assembly;

h. wires operatively connecting said plurality of facial clips to said set of facial actuators wherein said set of facial actuators independently actuate said frontal clips, said nasal clips, and said oral clips via said wires to stretch and compress said artificial skin at said face portion to mimic human facial expressions;

i. an exoskeleton structure supporting said upper body assembly, said legs assembly, and said head assembly, wherein said exoskeleton structure is heat resistant to allow operation in different environmental temperatures; and j. a processor unit embedded inside the upper body assembly, said processor unit is programmed with deep learning algorithms to learn to perform human tasks, wherein said processor unit receives environmental touch feedback from said pressure sensors and controls said set of facial actuators to produce said human facial expressions.

* * * * *